US008420181B2

(12) United States Patent
Kim

(10) Patent No.: US 8,420,181 B2
(45) Date of Patent: Apr. 16, 2013

(54) METHOD OF PRODUCING MICROFLUIDIC DEVICES BASED ON A POLYMER

(75) Inventor: Sang Kyung Kim, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 13/017,591

(22) Filed: Jan. 31, 2011

(65) Prior Publication Data

US 2012/0107195 A1 May 3, 2012

(30) Foreign Application Priority Data

Oct. 28, 2010 (KR) ........................ 10-2010-0105812

(51) Int. Cl.
G01N 15/06 (2006.01)
G01N 33/00 (2006.01)
G01N 33/48 (2006.01)

(52) U.S. Cl.
USPC ............ 427/487; 422/50; 422/68.1; 422/502; 422/503; 422/509; 427/493; 427/497; 427/508; 427/509; 106/635; 106/733; 106/428; 106/430

(58) Field of Classification Search ................... 422/50, 422/68.1, 502, 503, 509; 427/487, 493, 497, 427/508, 509; 106/635, 733, 166.81, 204.2, 106/428, 430
See application file for complete search history.

(56) References Cited

U.S. PATENT DOCUMENTS

2002/0185184 A1* 12/2002 O'Connor et al. ............ 137/822
2010/0075865 A1* 3/2010 Trau et al. ........................ 506/9
2011/0283778 A1* 11/2011 Angelescu et al. .......... 73/53.01

* cited by examiner

Primary Examiner — Brian J Sines
(74) Attorney, Agent, or Firm — Cantor Colburn LLP

(57) ABSTRACT

Disclosed is a method for producing a polymer-based microfluidic device, including: forming a microstructure on a lower polymer matrix; coating the lower polymer matrix with $TiO_2$ to perform patterning of $TiO_2$; bonding the lower polymer matrix with an upper polymer matrix; and radiating UV lights thereto to convert $TiO_2$-coated regions into hydrophilic regions. Disclosed also is a polymer-based microfluidic device obtained by the method. The method enables development of a microfluidic device having high stability and long-term durability.

8 Claims, 7 Drawing Sheets (a) $TiO_2$ pattern (b) Bonding (c) UV radiation (d) Fluid control (a)

(b)

METHOD OF PRODUCING MICROFLUIDIC DEVICES BASED ON A POLYMER

CROSS-REFERENCE TO RELATED APPLICATION

This application claims priority to Korean Patent Application No. 10-2010-0105812, filed on Oct. 28, 2010, and all the benefits accruing therefrom under 35 U.S.C. §119, the contents of which in its entirety are herein incorporated by reference.

BACKGROUND

1. Field

The present disclosure relates to a method for producing a polymer-based microfluidic device.

2. Description of the Related Art

Microarray and microfluidic technologies are very powerful and widespread tools in biochemical or cellular studies. Platforms based on the technology were applied to biomolecular interactions, cell-based assays, disease diagnosis and biomimetic tissue engineering. In case of microarlights, hydrophobicity/hydrophilicity contrast enables uniform sample volume or exclusive cell patterning that is crucial to achieve reliable assays from each spot of the array. Therefore, there has been a need for developing a microarray matrix subjected to hydrophobicity/hydrophilicity modification.

Recently, most of microfluidic channels were made from plastic material since the mass production is now possible and the cost of fabrication and material is much lower than glass microchannel's. Most of plastic microfluidic chips experience difficulties in delivering aqueous samples due to the inherent hydrophobicity.

As a result, there has been a continuous need for developing a plastic microfluidic channel having hydrophobic/hydrophilic contrast.

SUMMARY

The present disclosure is directed to providing a method for producing a polymer-based microfluidic device having hydrophobic/hydrophilic contrast.

In one aspect, there is provided a method for producing a polymer-based microfluidic device, including:

forming a microstructure on a lower polymer matrix;

coating the lower polymer matrix with $TiO_2$ to perform patterning of $TiO_2$;

bonding the lower polymer matrix with an upper polymer matrix; and radiating UV lights thereto to convert $TiO_2$-coated regions into hydrophilic regions.

In another aspect, there is provided a polymer-based microfluidic device obtained by the above-mentioned method.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
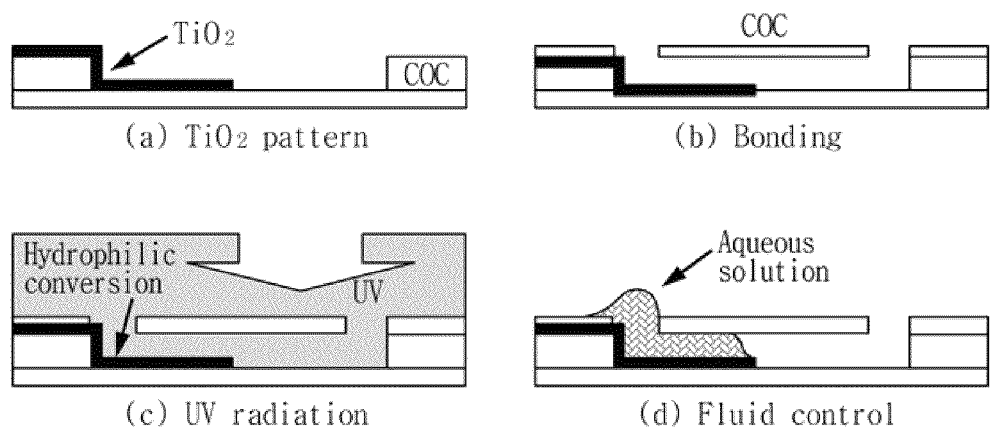
FIG. 1 illustrates handling of liquid with a hydrophobic/hydrophilic contrast of a $TiO_2$-patterned microchannel, wherein portion (a) shows patterning of $TiO_2$, portion (b) shows an upper polymer matrix covering a lower polymer matrix, portion (c) shows conversion of a $TiO_2$-coated region into a hydrophilic region under UV radiation, and portion (d) shows loading of an aqueous fluid.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

As used herein, the term 'microfluidic device' means a fluidic device including at least one microstructure, and the term 'microstructure' does not mean a structure with a micrometer scale but means a structure with a small scale. The microfluidic device may be a device providing a path of fluid flow. For example, the microfluidic device may be a microflow device having an inlet and an outlet connected to each other through at least one channel, and may have a microstructure selected from the group consisting of channels, chambers, inlets and outlets, optionally further including additional structures, such as valves or pumps. The microstructure may be formed partially in a matrix on the surface thereof, in the inner part thereof or both.

In one exemplary embodiment, the polymer includes plastics having a hydrophobic surface, and non-limiting examples thereof include any one selected from the group consisting of: cycloolefin copolymer (COC), polymethylmethacrylate (PMMA), polycarbonate (PC), cycloolefin polymer (COP), liquid crystalline polymers (LCP), polyamide (PA), polyethylene (PE), polyimide (PI), polypropylene (PP), polyphenylene ether (PPE), polystyrene (PS), polyoxymethylene (POM), polyetheretherketone (PEEK), polyethersulfone (PES), polyethylenephthalate (PET), polytetrafluoroethylene (PTFE), polyvinylchloride (PVC), polyvinylidene fluoride (PVDF), polybutylene terephthalate (PBT), fluorinated ethylenepropylene (FEP), and perfluoralkoxyalkane (PFA). Particularly, the polymer may be a cycloolefin copolymer (COC).

In one exemplary embodiment, COC enables photolithographic patterning on a surface due to its high UV transmittance and chemical stability, and thus is suitable for fabrication of a microfluidic channel. COC may also be assembled into a microfluid chip by surface modification with strong UV radiation. When using COC, a Water contact angle was reduced to 45° and facilitated loading of hydrogel into the channel. However, the wettability of plastic is known to change gradually over time resulting in blockage of liquid flow. Therefore, according to the present disclosure, we constructed photocatalytic $TiO_2$ film on COC microchannels (FIG. 1, portions (a) and (b)) t to overcome the long-term stability issue of polymer microchannels, and then induced high contrast of hydrophobicity/hydrophilicity upon radiation of UV lights (FIG. 1, portion (c The hydrophbic/hydrophilic pattern functions as a passive valve to stop aqueous fluid in the microchannel (FIG. 1, portion (d)). It enables steady loading of aqueous solution into the microchannels and rinse-free fabrication of hydrogel-integrated microfluidic chips. This fabrication method may be successfully applied to improve the micro-electroporators.

In one exemplary embodiment, injection molding or photolithographic processes may be used to form the microstructure in the lower polymer matrix.

In another exemplary embodiment, coating with $TiO_2$ may be carried out by any one process selected from the group consisting of liquid phase deposition (LPD), evaporation, sputtering and chemical vapor deposition (CVD) processes. Particularly, LPD may be used.

LPD of $TiO_2$ may be carried out at 70-90° C. at least once. To accomplish uniform deposition of $TiO_2$, the temperature where LPD is performed is important. When the LPD temperature is lower than 70° C., $TiO_2$ may be coated non-uniformly. On the other hand, when the LPD temperature is higher than 90° C., the matrix may be deformed.

In one embodiment, the $TiO_2$ coating may be finished by LPD followed by lift-off.

Even though there are numerous reports on photocatalytic $TiO_2$ thin films prepared by chemical vapor doposition (CVD), anodization and thermal oxidation of Ti metal, ultrasonic nebulization and pyrolysis, and $TiO_2$ sol coating, high process temperature or annealing temperature impeded their application to plastic substrates. $TiO_2$ could be selectively deposited on hydrophilic polymer multilayer when the contact printing of polystyrene-b-polyvinylpyridine (PS-b-PVP) define the exposure of hydrophilic polymer. However, the photocatalytic effect of $TiO_2$ upon the deposition to a polymer is discovered for the first time in the present disclosure.

In one exemplary embodiment, the method may further include forming a seed layer by coating the lower polymer matrix with a Ti or $TiO_2$ thin film before the $TiO_2$ patterning operation. The seed layer coating may be performed by sputtering. The coated Ti or $TiO_2$ thin film may have a thickness of 10-100 nm. When the thickness is less than 10 nm, a non-uniform film may be formed. On the other hand, when the thickness is greater than 100 nm, optical transmittance is degraded significantly and there is no benefit derived from such increased cost.

The upper polymer matrix to be bonded with the lower polymer matrix may include an inlet hole and an outlet hole through which a fluid is loaded, and may further include a valve or pump.

To bond the upper polymer matrix with the lower polymer matrix, a thermal bonding process may be used at 100-180° C. When the thermal bonding temperature is lower than 100° C., bonding strength becomes too low and non-bonded regions are generated frequently. When the thermal bonding temperature is higher than 180° C., photocatalytic properties of a $TiO_2$ thin film may be degraded.

In another aspect, there is provided a polymer-based microfluidic device obtained by the above-described method. The term 'microfluidic device' may include any fluidic devices having a microstructure as well as microfluid channels and microfluidic chips.

EXAMPLES

The examples (and experiments) will now be described. The following examples (and experiments) are for illustrative purposes only and not intended to limit the scope of the present disclosure.

Example 1

Preparation of Reagents and Materials

First, $TiCl_3$ (Cica merck, Japan), 25% $NH_4OH$ (Daejung Chemicals & Metals Co., Ltd., Korea), a polydimethylsiloxane (PDMS) matrix and a SYLGARD 184 silicone elastomer kit (Dow Corning Co., USA) are provided, and the liquid mixture of base and curing agent was solidified on a hot plate at 85° C. for 45 min. Chemicals for conductive hydrogel such as diallyldimethyl ammonium chloride, 2-hydroxy-4'-(2-hydroxymethyl)-2-methylpropiophenone, N,N'-methylenebisarylamide and potassium chloride (KCl) were purchased by Sigma Aldrich. Hydrogel was made from a monomer mixture solution containing 65% monomer (diallyldimethyl ammonium chloride), 2% photoinitiator (2-hydroxy-4'-(2-hydroxymethyl)-2-methylpropiophenone), 5% cross-linker (N,N'-methylene-bisarylamide) and 500 mM KCl.

Example 2

Deposition of $TiO_2$ and UV Radiation

Thin film of Ti and oxidized Ti was sputtered (SHES-4M-300T, Sam-Han Vacuum Development Co.) to the thickness of 50 nm on fresh COC or PDMS substrates. The sputtered thin films were seed layers for liquid phase deposition (LPD) of $TiO_2$. 0.1 M $TiCl_3$ solution was kept at 90° C. and gradually buffered to pH 1.2 with 20% $NH_4OH$ aqueous solution. The $TiO_2$ nanoparticles turned the color of solution into pale purple. $TiO_2$ film has been deposited on a substrate by slow hydrolysis of $TiCl_3$ solution. One cycle of LPD is composed of 1 dip and 1 rinse and drying. Polymer substrates were dipped into the $TiCl_3$ solution for 10 sec and rinsed with deionized water for 5 sec and, then, dried with $N_2$ blow for 3 sec. The LPD cycle was repeated as specifically mentioned. UV radiation for hydrophilic conversion of $TiO_2$ surface was conducted with portable UV lamp (Clean Maker Co., Korea). Hydrophilicity of surface was measured with anglometer Phoenix 300 (Surface Electro Optics Inc.). The morphology of substrates was investigated with a scanning electron microscopy (Nova NanoSEM 200, FEI Inc.)

Figure 2:
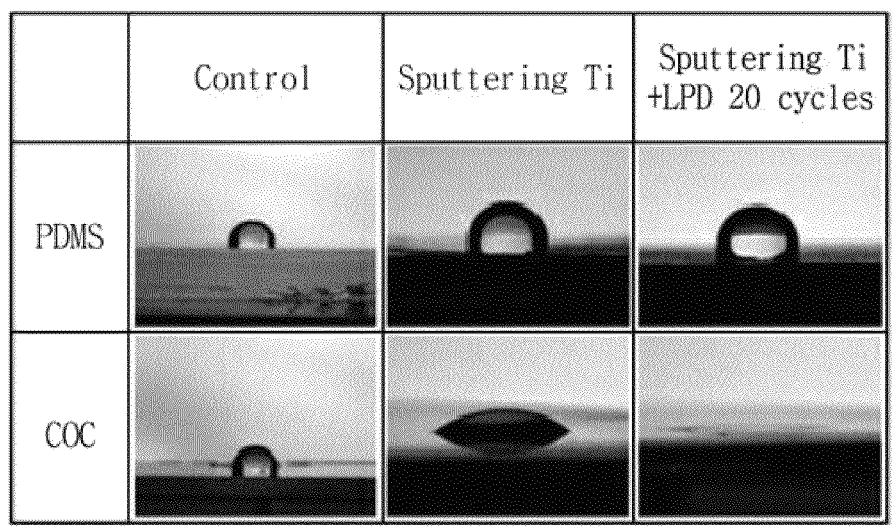
FIG. 2 shows optical images of water drops on polydimethylsiloxane (PDMS) and cycloolefin copolymer (COC), after UV radiation, wherein $TiO_2$ liquid phase deposition (LPD) is repeated for 20 cycles and UV lights are radiated with an intensity of 0.04 mW/cm² for 30 minutes.

FIG. 2 shows water contact angles under different conditions. After repeating 20 LPD cycles and carrying out UV radiation with 70 mJ, the hydrophobic surface of the COC matrix is converted into an ultra-hydrophilic surface. The Ti film applied via sputtering shows a soft hydrophilic surface due to its OH groups. The surface of PDMS shows lower hydrophobicity after Ti deposition via sputtering or LPD of $TiO_2$. However, it is not possible to observe photocatalytic switching.

$TiO_2$ particles have a uniform size of 100 nm and start to be coated on the whole regions of the COC surface with high density after repeating 10 cycles of LPD. It can be seen that $TiO_2$ particles are scattered on the surface of PDMS.

Figure 3:
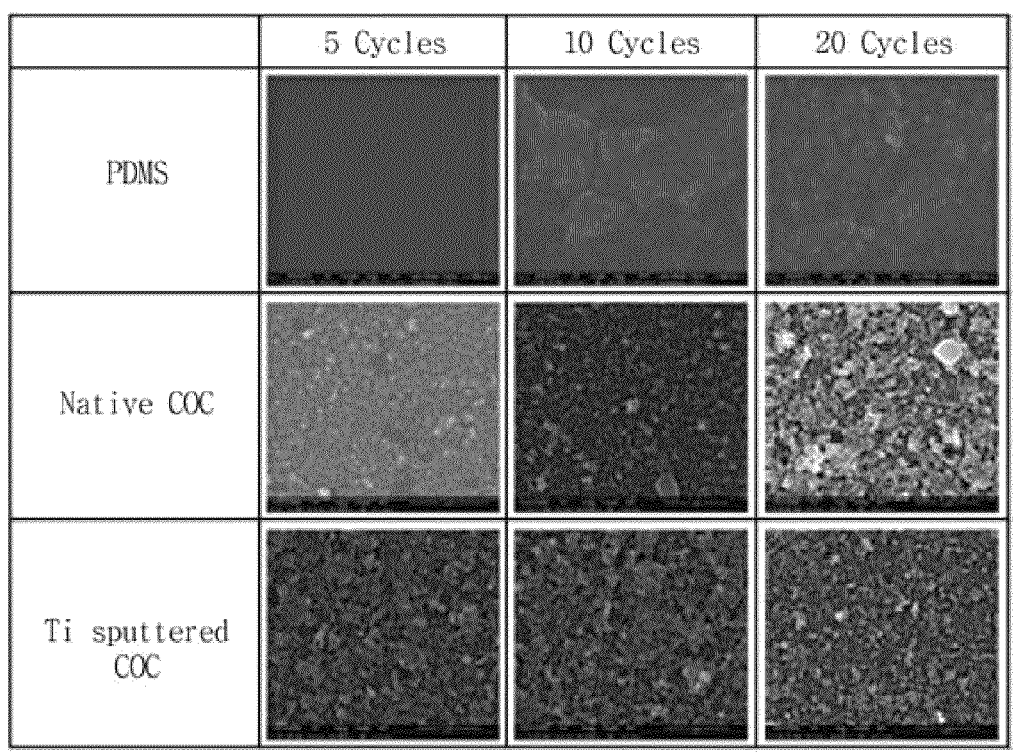
FIG. 3 shows scanning electron microscopy (SEM) images of COC coated with $TiO_2$ by LPD for 5 cycles, 10 cycles and 20 cycles.

To accomplish adhesion between $TiO_2$ and the matrix, Ti may be applied to the matrix via sputtering so that it serves as a seed layer. The thin film formed via sputtering shows higher adhesion to the matrix. Ti particles applied to COC via sputtering have a very uniform size of 50 nm (FIG. 3). It can be also seen that Ti-coated COC after 5 cycles of LPD shows more dense $TiO_2$ particles as compared to non-Ti-coated COC after 10 cycles of LPD. This suggests that the Ti seed layer accelerates growth of $TiO_2$ in liquid. In the case of PDMS, $TiO_2$ quality is not improved significantly even with the aid of the Ti seed layer. Ti particle size on PDMS is smaller than the corresponding size on COC, and Ti particles are agglomerated on PDMS to a size of 30-100 nm. The adhesion between PDMS and Ti is not sufficient, and growth of $TiO_2$ particles adversely affects the affinity of $Ti/TiO_2$ to the PDMS matrix.

Figure 4:
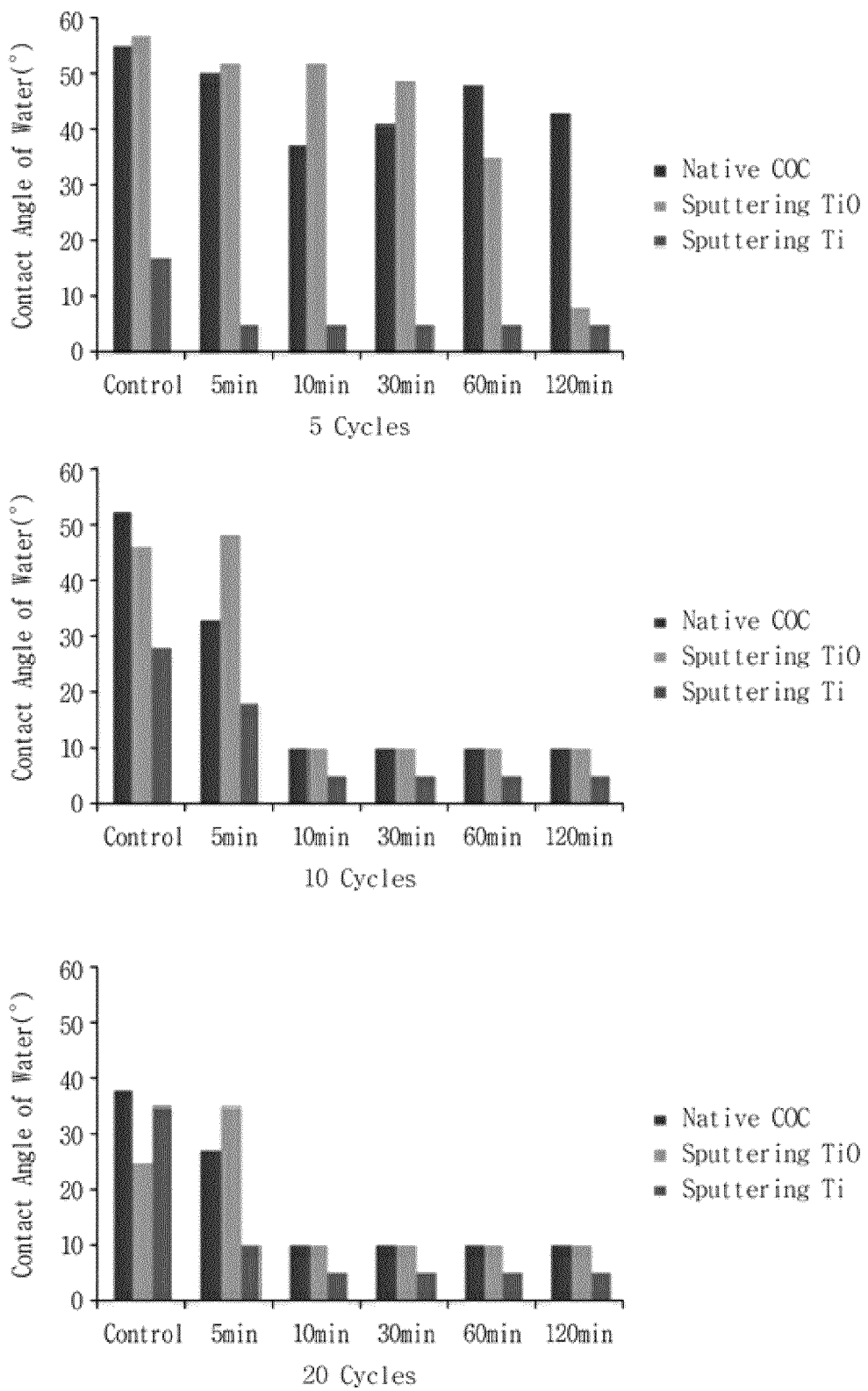
FIG. 4 shows water contact angles on the surface of a COC matrix after UV radiation, wherein measurement below 10° is not available, and LPD is carried out for 5 cycles, 10 cycles and 20 cycles.

The seed layer of titanium dioxide or Ti improves photocatalytic activity as well as growth of $TiO_2$ and stability during LPD. FIG. 4 shows that the seed layer accelerates the hydrophilic conversion of the COC matrix and the improvement in photocatalytic activity caused by the Ti seed layer is independent from the number of LPD cycles. Only one cycle of LPD is sufficient to improve photocatalytic activity in the presence of the seed layer.

Figure 5:
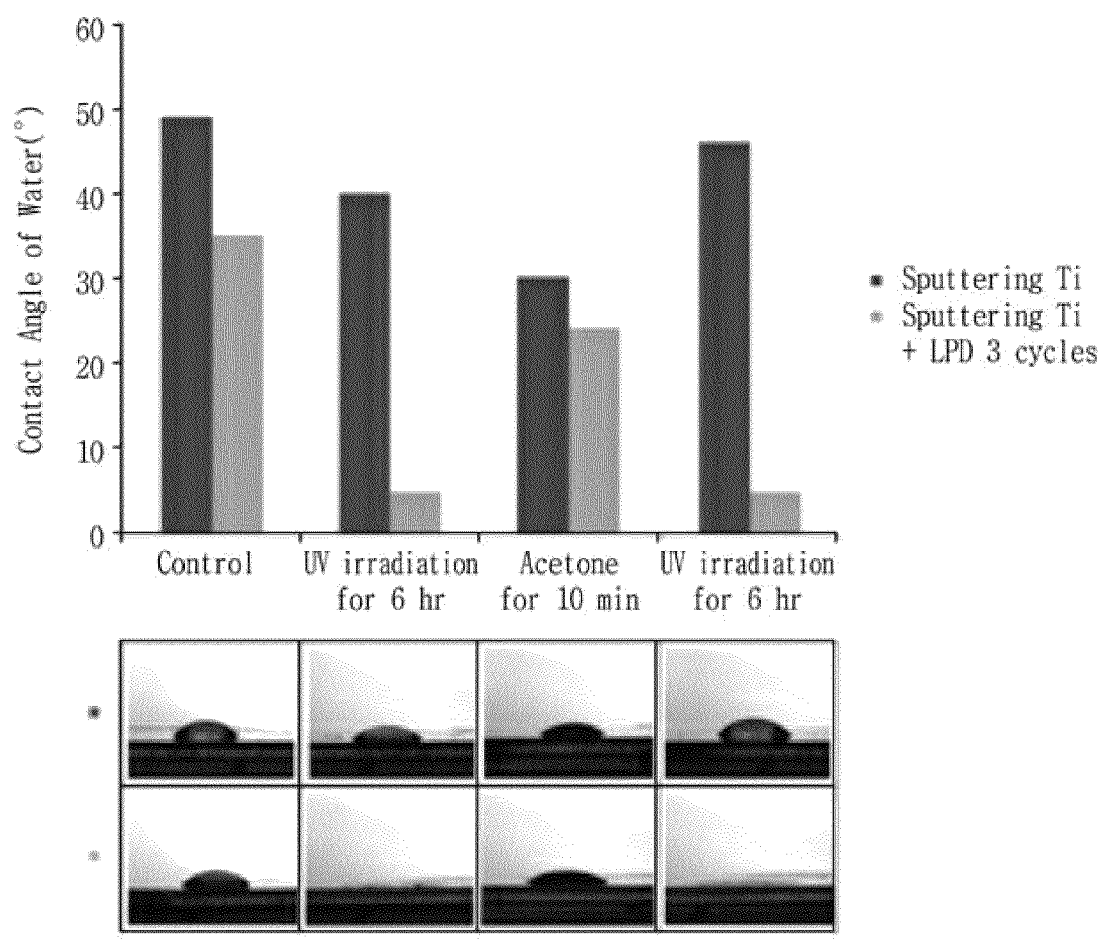
FIG. 5 shows hydrophilic restoration after organic contamination, wherein UV lights are radiated to a COC slide having a thickness of 0.5 mm under 700 mJ.

After contaminating the surface of $TiO_2$ grown on COC with an organic solution, stability of optical activity is tested and the results are shown in FIG. 5. The $TiO_2$-coated COC has a water contact angle increased to 30° when it is dipped into acetone for 10 minutes. The UV-radiated COC slide restores its water contact angle to less than 10°. This suggests that a hydrophilic surface is obtained in the microchannel and the $TiO_2$ layer is suitable for an organic chemical process, such as photolithography.

Figure 6:
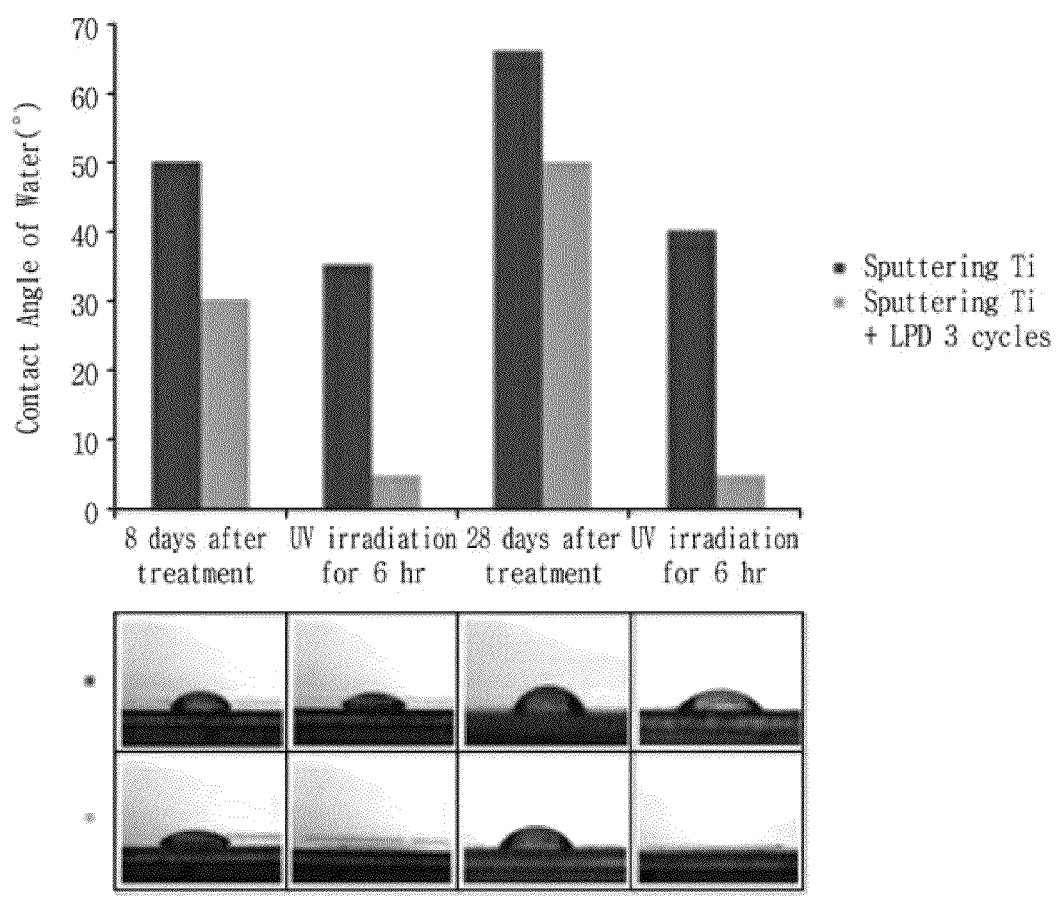
FIG. 6 shows long-term stability of photocatalytic activity of $TiO_2$-deposited COC, wherein UV lights are radiated to a COC slide having a thickness of 0.5 mm under 700 mJ.

FIG. 6 shows the results of the long-term stability after monitoring for 4 months. The $TiO_2$-deposited COC is tested under normal humidity at room temperature. While titanium dioxide applied via sputtering dose not show any significant photocatalytic effect, the LPD $TiO_2$ film shows stable photocatalytic restoration of hydrophilicity after one month and has a water contact angle of 20° even after 4 months. It is thought that this results from a drop in photocatalytic activity due to the lone-term contamination. Therefore, when the chip is stored in a non-active state, it will be storable for a longer time.

Example 3

Fabrication of Microfluidic Chip with COC

The polymer plates with microstructures were fabricated through injection molding. COC replicas were made from a Ni mold, whose structure was defined by SU-8 microstructure.

Pattern for $TiO_2$ was achieved through photolithography. Photoresist AZ4620 (AZ Electronics Materials, USA) was spincoated on bottom COC plates containing microtrenches. Then, the bottom plate was exposed to 3 $J/cm^2$ at 365 nm through a Cr-patterned mask. The photoresist was developed with 25% AZ400K aqueous solution for 150 sec. On the photoresist pattern, Ti was sputtered to 50 nm and $TiO_2$ was coated through LPD. $TiO_2$ pattern was completed by removing photoresist though lift-off. Top plate of COC was drilled for inlet and outlet and assembled with the TiO2 patterned bottom plate through a thermal bonding at 150° C. The dimension of the microchannel was 40 μm×40 μm at the narrowest region.

Figure 7:
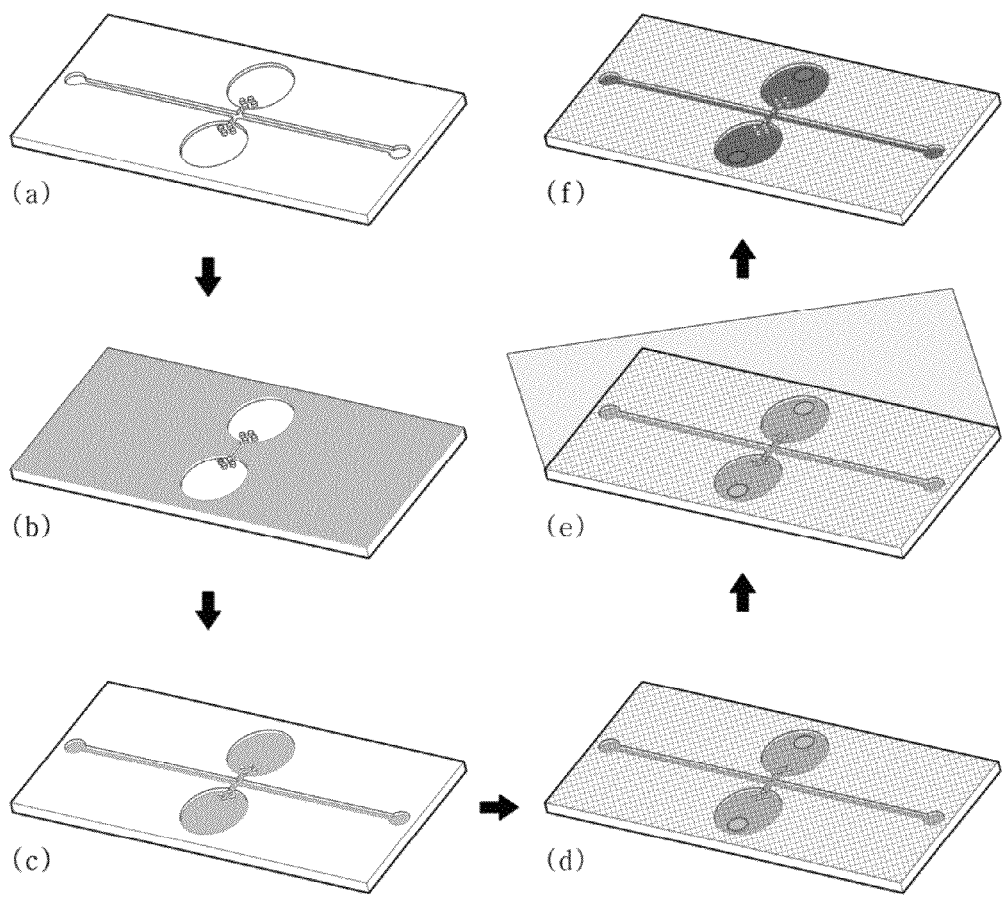
FIG. 7 shows a flow diagram of fabrication of a microfluidic chip formed integrally with conductive hydrogel, wherein the hydrogel structure is finished by liquid loading and UV radiation.

FIG. 7 shows a flow diagram of a process for fabricating a microfluidic chip with hydrogel starting from COC replicas. Portion (a) shows patterning of a $TiO_2$ layer on a COC plate having fine grooves, and portion (b) shows patterning of a photoresist. Portion (c) shows $TiO_2$ LPD followed by lift-off, portion (d) shows bonding an upper plate to the $TiO_2$-patterned COC plate, and portion (e) shows conversion of the $TiO_2$-coated regions into ultra-hydrophilic surfaces under 700 mJ UV radiation. Portion (f) shows a mixed monomer solution loaded into the microchannel and positioned at a desired site.

After bonding the lower and upper COC plates to each other, the resultant microchannel includes three $TiO_2$-coated regions and one COC surface in a predetermined section. After the UV radiation for the hydrophilic conversion of the $TiO_2$ surface, the aqueous solution is loaded into the chip. Since the loading power is higher at the three hydrophilic surfaces than the single COC surface, meniscus of water proceeds gradually and stops at the end of the $TiO_2$ pattern.

Figure 8:
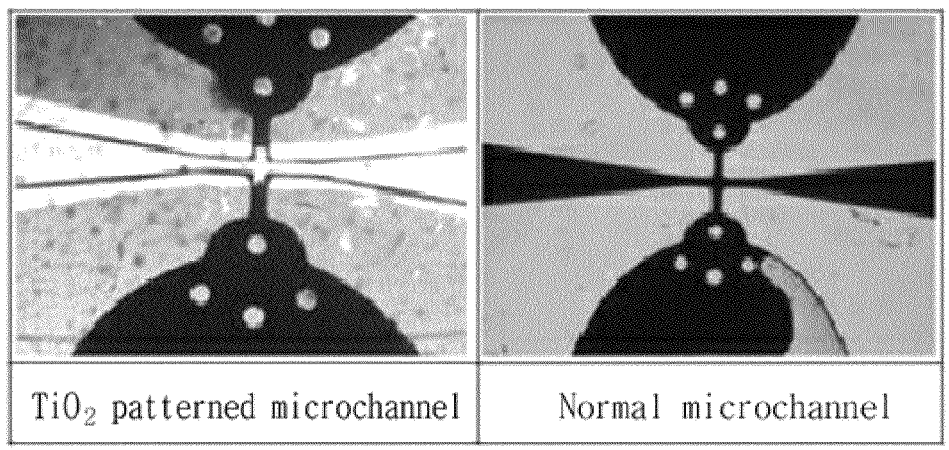
FIG. 8 shows optical views of a COC microfluidic chip when aqueous ink is introduced into a $TiO_2$-patterned microchannel and into a normal COC microchannel, in portion (a), and illustrates a hydrogel structure inside of a $TiO_2$-coated microchannel in portion (b).
Figure 8:
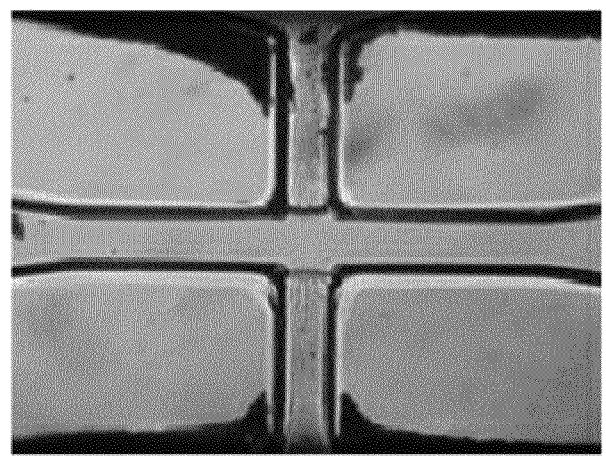

FIG. 8 shows, in portion (a), that the ink is drawn into the hydrophobic COC microchannel and is loaded spontaneously into the $TiO_2$-patterned channel. During the fabrication, the microchannel may be contaminated with organic chemicals, such as photoresist or solvents. The photocatalytic activity of $TiO_2$ removes organic contaminants and allows the $TiO_2$ surface to restore strong hydrophilicity.

According to the related art, a non-cured monomer solution is removed after in situ photopolymerization, and the channel is washed with buffer. As shown in portion (b) of FIG. 8, the method disclosed herein requires no washing, and thus allows mass production of chips. The monomer solution for hydrogel is loaded spontaneously like ink, and the hydrogen-incorporated chip is set under the sunlights for 10 minutes, thereby finishing the production of chip.

According to the method disclosed herein, it is possible to develop a microfluidic device having high stability and long-term durability.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for producing a polymer-based microfluidic device, comprising:
    forming a microstructure on a lower polymer matrix;
    coating the lower polymer matrix with $TiO_2$ to perform patterning of $TiO_2$;
    bonding the lower polymer matrix with an upper polymer matrix; and
    radiating UV lights thereto to convert $TiO_2$-coated regions into hydrophilic regions, wherein the polymer is a plastic having a hydrophobic surface which is cycloolefin copolymer (COC), and
    wherein the microstructure is formed in a matrix in an inner part thereof.

2. The method for producing a polymer-based microfluidic device according to claim 1, wherein the LPD of $TiO_2$ is carried out at 70-90° C.

3. The method for producing a polymer-based microfluidic device according to claim 1, which further comprises coating the lower polymer matrix with a thin film of Ti or $TiO_2$ to form a seed layer, before said coating and patterning of $TiO_2$.

4. The method for producing a polymer-based microfluidic device according to claim 3, wherein said coating is carried out by sputtering.

5. The method for producing a polymer-based microfluidic device according to claim 3, wherein the coated thin film of Ti or $TiO_2$ has a thickness of 10-100 nm.

6. The method for producing a polymer-based microfluidic device according to claim 1, wherein the upper polymer matrix has an inlet hole and an outlet hole through which a fluid is loaded.

7. The method for producing a polymer-based microfluidic device according to claim 1, wherein said bonding is carried out by thermal bonding at 100-180° C.

8. The method for producing a polymer-based microfluidic device according to claim 1, wherein said coating of $TiO_2$ is carried out by any one process selected from the group consisting of liquid phase deposition (LPD), sputtering and chemical vapor deposition (CVD).

* * * * *